United States Patent
Jo

(10) Patent No.: US 8,970,086 B2
(45) Date of Patent: Mar. 3, 2015

(54) STATOR CORE OF ROTOR

(75) Inventor: Jungwoo Jo, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 48 days.

(21) Appl. No.: 13/483,872

(22) Filed: May 30, 2012

(65) Prior Publication Data

US 2013/0076200 A1  Mar. 28, 2013

(30) Foreign Application Priority Data

Sep. 27, 2011  (KR) .................. 10-2011-0097475

(51) Int. Cl.
*H02K 1/06* (2006.01)
*H02K 15/02* (2006.01)
*H02K 1/14* (2006.01)

(52) U.S. Cl.
CPC .............. *H02K 15/022* (2013.01); *H02K 1/148* (2013.01)
USPC ...... 310/216.135; 310/216.009; 310/216.008; 310/216.067

(58) Field of Classification Search
USPC ............. 310/44, 216.008, 216.009, 216.049, 310/216.066, 216.067, 216.109, 216.135
See application file for complete search history.

(56) References Cited

U.S. PATENT DOCUMENTS

| | | | | |
|---|---|---|---|---|
| 2,502,185 | A | * | 3/1950 | Thomas ................. 310/216.135 |
| 6,226,856 | B1 | * | 5/2001 | Kazama et al. .................. 29/596 |
| 6,265,804 | B1 | * | 7/2001 | Nitta et al. ............. 310/216.066 |
| 6,919,665 | B2 | * | 7/2005 | Murakami et al. ..... 310/216.043 |
| 7,067,952 | B2 | * | 6/2006 | Neal .......................... 310/254.1 |
| 7,986,064 | B2 | * | 7/2011 | Katagiri et al. .................. 310/43 |
| 2009/0121577 | A1 | * | 5/2009 | Tatematsu et al. ............ 310/218 |
| 2009/0284096 | A1 | * | 11/2009 | Katagiri et al. ......... 310/216.001 |

* cited by examiner

*Primary Examiner* — Dang Le
(74) *Attorney, Agent, or Firm* — Saliwanchik, Lloyd & Eisenschenk

(57) ABSTRACT

A stator core for a motor is disclosed, the stator core including at least one cylindrical stator core body formed in one body by using a metallic mold so that a plurality of teeth is protruded to a same direction each at a predetermined gap, and both distal ends of the stator core body are coupled through a bending process for each horizontal predetermined section about a center of the teeth, and a fixing unit provided at both distal ends of stator core body to fix the stator core body in a cylindrical shape.

13 Claims, 3 Drawing Sheets

STATOR CORE OF ROTOR

CROSS-REFERENCE TO RELATED APPLICATION

This application claims the benefit under 35 U.S.C. §119 of Korean Patent Application No. 10-2011-0097475, filed Sep. 27, 2011, which is hereby incorporated by reference in its entirety.

BACKGROUND

This section provides background information related to the present disclosure which is not necessarily prior art.

The present disclosure relates to a stator core of a rotor. Generally, a stator core used for a motor is provided with a cylindrical core member of metallic material, and is protrusively formed at an inner circumferential surface with a plurality of teeth wound with a coil.

Recently, concomitant with miniaturization of a motor, and in response to a need for miniaturizing and reducing the stator core in weight, a conventional one-bodied stator core is sidelined and a stator core formed by stacking thin metal plates at a predetermined thickness has surfaced, or a cylindrical stator core is frequently favored by assembling split cores each having an approximate 'T' shape and a tooth.

However, there is a cumbersome problem in stacking the stator cores in that a plurality of metal plate sheets is performed with a press work each in a same shape, and the each plate sheet must be stacked in a separate process. Another problem of forming the cylindrical stator core through pressfitting of each split core is that an adhesive must be separately used or complementary shapes must be provided to fill up an air gap at each coupled area of the split cores after assembly, in the process of forming the split cores by molding or sintering each split core, and assembling each split core for a cylindrical stator core.

Recently, in order to solve the aforementioned problems, a plurality of unit cores is stacked, the stacked unit cores are simultaneously bent, one or more stacked unit cores that have passed the bending process is coupled to form a ring-shaped stator core, the technique of which is disclosed in a Korean Laid-Open Patent No. 2008-0078944 (Opened on Aug. 29, 2011).

However, the disclosure has a high probability of developing a product defect caused by disengagement in core coupling in the course of coupling of the stator cores that have passed the bending process, and another problem may be generated of reducing a motor efficiency or developing a performance deficiency if the coupled parts are not tightly secured.

It is, therefore, desirable to overcome the above problems and others by providing an improved stator core for a motor.

BRIEF SUMMARY

This section provides a general summary of the disclosure, and is not a comprehensive disclosure of its full scope or all of its features.

The present disclosure is to provide a stator core for a motor configured to form a cylindrical stator core in one body through roll-up or wrap-up, whereby a coupled structure at each facing coupled portion can be tightly secured.

Exemplary embodiments may, however, be implemented in many different forms and should not be construed as being limited to the embodiments set forth herein; Other features and advantages of the disclosed embodiments will be or will become apparent to one of ordinary skill in the art upon examination of the following figures and detailed description.

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

According to one aspect of the present disclosure, the object described above may be achieved by a stator core for a motor which comprises: at least one cylindrical stator core body formed in one body by using a metallic mold so that each of a plurality of teeth is protruded to a same direction each at a predetermined gap, and both distal ends of the stator core body are coupled through a bending process for each horizontal predetermined section about a center of the teeth; and a fixing unit provided at both distal ends of stator core body to fix the stator core body in a cylindrical shape.

In some exemplary embodiments of the present disclosure, the fixing unit includes a fixing lug protrusively formed at a distal end of one side of the stator core body, and a concave fixing groove formed at a distal end of the other side of the stator core body in a complementary shape with the fixing lug.

In some exemplary embodiments of the present disclosure, the fixing unit includes a pin groove formed at both distal ends of the stator core body, and a fixing pin press-fitted into the pin groove.

In some exemplary embodiments of the present disclosure, the pin groove includes at least two or more hitching sills, and an opening opened in association with the hitching sills to inhibit the fixing pin from being disengaged from the pin groove to a direction perpendicular to a direction of an inserted coupling of the fixing pin.

In some exemplary embodiments of the present disclosure, the pin groove is provided in a 'T' shape, and the fixing pin inserted into a pair of pin grooves is provided in a 'H' shape.

In some exemplary embodiments of the present disclosure, each corner of the fixing pin and the pin groove is rounded.

In some exemplary embodiments of the present disclosure, the fixing pin is provided in a same thickness as that of the stator core body.

In some exemplary embodiments of the present disclosure, the stator core body is provided with a hook unit of a complementary shape about a lug adjacent to the tooth for keeping a cylindrical shape during the bending process.

In some exemplary embodiments of the present disclosure, an edge portion of the hook unit in an interlocking complementary structure is rounded.

In some exemplary embodiments of the present disclosure, a gap groove is formed at a position adjacent to the hook unit for reducing interference during the bending process of the stator core body.

The stator core for a motor according to the present disclosure has an advantageous effect in that reliability at a coupled area of the stator core formed by roll-up of a single body is enhanced to improve fixedness and assembly efficiency.

Another advantage is that an air gap at each split core is minimized during assembly of stator core to ease assemblage and transportation of a motor and to reduce a work loss caused by assembly error at a core unit.

BRIEF DESCRIPTION OF DRAWINGS

Non-limiting and non-exhaustive embodiments of the present disclosure are described with reference to the following drawings, in which.

DETAILED DESCRIPTION

Now, exemplary embodiments of the present disclosure will be described in detail with reference to the drawings.

Figure 1:
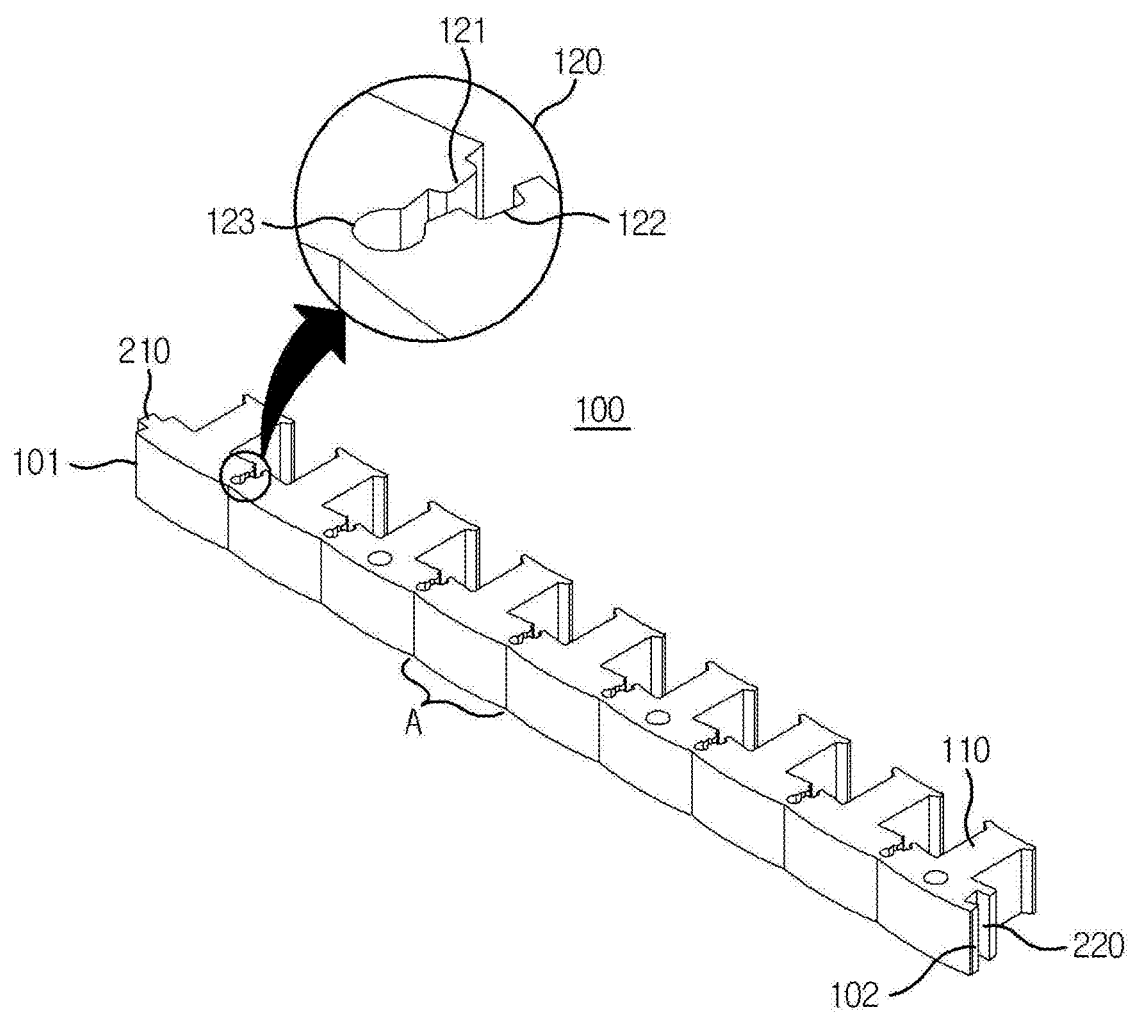
FIG. 1 is a perspective view illustrating a stator core formed at the metallic mold prior to bending.
Figure 2:
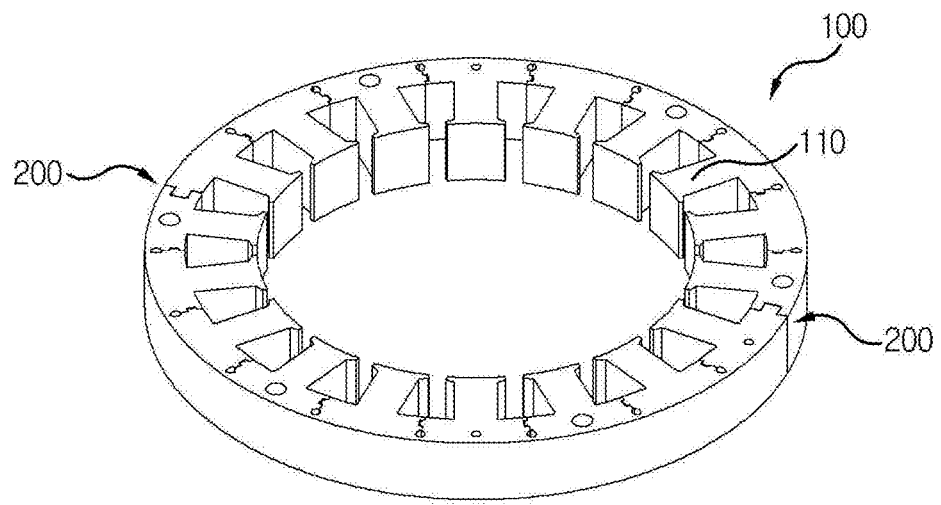
FIG. 2 is a perspective view of a state in which the stator core of FIG. 1 is rolled up by bending in a cylindrical shape as a fixing unit according to a first exemplary embodiment of the present disclosure.
Figure 3:
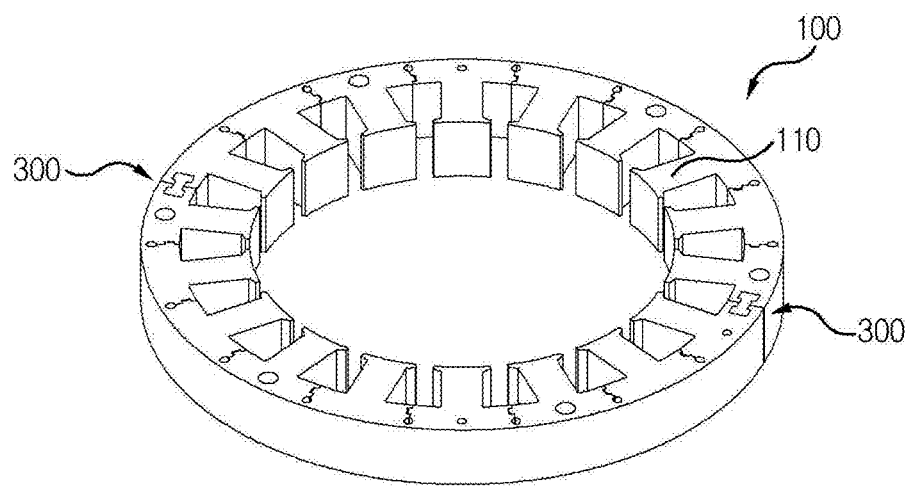
FIG. 3 is a perspective view illustrating a state in which the stator core of FIG. 1 is rolled up by bending in a cylindrical shape as a fixing unit according to a second exemplary embodiment of the present disclosure.
Figure 4:
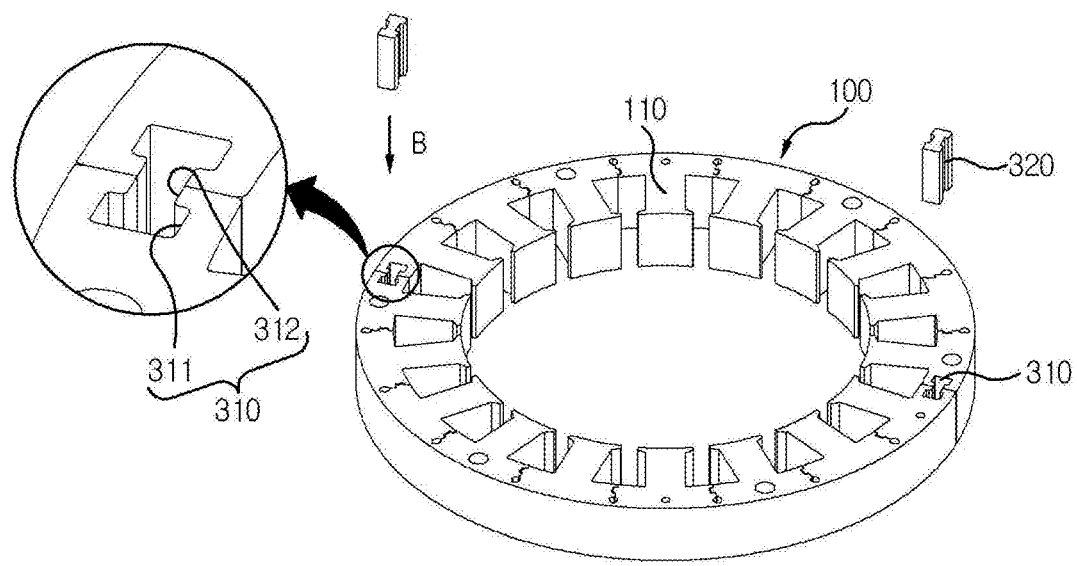
FIG. 4 is an exploded perspective view of an exploded fixing pin of FIG. 3.

FIG. 1 is a perspective view illustrating a stator core formed at the metallic mold prior to bending, FIG. 2 is a perspective view of a state in which the stator core of FIG. 1 is rolled up by bending in a cylindrical shape as a fixing unit according to a first exemplary embodiment of the present disclosure, FIG. 3 is a perspective view illustrating a state in which the stator core of FIG. 1 is rolled up by bending in a cylindrical shape as a fixing unit according to a second exemplary embodiment of the present disclosure, and FIG. 4 is an exploded perspective view of an exploded fixing pin of FIG. 3.

Referring to FIGS. 1 and 2, a stator core according to the present disclosure includes a stator core body 100 and a fixing unit 200. The stator core body 100 is formed, preferably in cylindrical shape, in one body by using a metallic mold so that each of a plurality of teeth 110 is protruded to a same direction, each at a predetermined gap, and both distal ends 101, 102 of the stator core body 100 are coupled through a bending process for each horizontal predetermined section (A) about a center of the teeth 100.

Meanwhile, the stator core body 100 is preferably formed at a surrounding area of an adjacent protrusive tooth 110 with a hook unit 120 in a complementary shape. The hook unit 120 may be formed at one side with a hook lug 121 in a complementary interlocking convex and concave structure, and may be formed at the other side with a lug accommodation groove 122 interlockably corresponding to the hook lug 121. At this time, each edge portion of the hook lug 121 and the lug accommodation groove 122 are rounded for smooth mutual coupling.

Furthermore, a position adjacent to the hook unit 120 may be further formed with a gap groove 123 for reducing interference for each section (A) during bending process of the stator core body 100. The gap groove 123 may be provided in a trench structure having an approximately round cross-section, and opened at one side, where the opened section communicates with the hook unit 120, as shown in FIG. 1.

Referring to FIGS. 1 and 2 again, the fixing unit 200 according to a first exemplary embodiment of the present disclosure, provided at both distal ends of the stator core body 100 to fix the stator core body 100 in a cylindrical shape, includes a fixing lug 210 and a fixing groove 220.

The fixing lug 210 may be protruded from a distal end of one side of the stator core body 100 to have an approximately square shape in cross-section. However, the shape is not limited thereto and the fixing lug 210 may take any shape of structure as long as the shape can inhibit the fixing lug 210 from being disengaged from the fixing groove 220. The fixing groove 220 is provided in a complementary shape with that of the fixing lug 210, and therefore concavely formed at the other distal end of the stator core body 100.

The fixing unit 200 thus configured according to a first exemplary embodiment of the present disclosure is fixed by a sliding-fit coupling method between the fixing lug 210 and the fixing groove 220, where a tolerance between the fixing lug 210 and the fixing groove 220 is minimized to fix the stator core body 100 in a cylindrical shape through a press-fit process.

Now, referring to FIGS. 3 and 4, a fixing unit 300 according to a second exemplary embodiment of the present disclosure includes a pin groove 310 and a fixing pin 320.

The pin grooves 310 may be formed at both distal ends of the stator core body 100, include at least two or more hitching sills 311 and an opening 312 communicating with the hitching sill 311, and inhibit the fixing pin 320 from being disengaged to a direction perpendicular to a direction (B arrow direction of FIG. 4) of an inserted coupling of the fixing pin 310.

According to the exemplary embodiment of the present disclosure, it is preferable that the pin grooves 310 be symmetrically formed at distal ends 101, 102 (see FIG. 1) of the stator core body 100 each in an identical shape.

The fixing pin 320 is provided in a complementary shape with that of the pin groove 310 to allowing being insertedly coupled to the pin groove 310. At this time, each of the pin grooves 310 formed at both distal ends 101, 102 of the stator core body 100 has a symmetrical shape of structure, such that the fixing pin 320 is preferably formed in horizontally symmetrical shape. The fixing pin 320 is press-fitted into the pin groove 310 to a direction parallel to an arrow B direction of FIG. 4.

According to the exemplary embodiment of the present disclosure, it is preferable that the pin grooves 310 be provided with an approximately 'T' shape, and a pair of the fixing pins 320 inserted into a pair of pin grooves 310 is provided with an approximately 'H' shape. The shapes are not limited thereto and any shape will be allowable as long as disengagement to a direction perpendicular to the arrow B direction can be avoided.

Furthermore, each corner of the pin grooves 310 and the fixing pins 320 is preferably formed in a round shape, and each of the pin grooves 310 and the fixing pins 320 is preferably provided in the same thickness as that of the stator core body 100.

As apparent from the foregoing, the stator core for a motor according to the present disclosure has an industrial applicability in that an air gap at each split core portion can be minimized during assembly of the stator core using the fixing unit 300 using the fixing pin 320, whereby assembly and transportation of the motor can be eased and a work loss caused by assembly error at the core unit can be reduced.

Any reference in this specification to "one embodiment", "an embodiment", "exemplary embodiment", etc., means that a particular feature, structure, or characteristic described in connection with the embodiment is included in at least one embodiment of the disclosure. The appearances of such phrases in various places in the specification are not necessarily all referring to the same embodiment.

Further, when a particular feature, structure, or characteristic is described in connection with any embodiment, it is submitted that it is within the purview of one skilled in the art to affect such feature, structure, or characteristic in connection with others of the embodiments. As may be used herein, the singular forms "a", "an" and "the" are intended to include the plural forms as well, unless the context clearly indicates otherwise. As may be used herein, the terms "substantially"

and "approximately" provide an industry-accepted tolerance for its corresponding term and/or relativity between items.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A stator core precursor, comprising:
   a linear stator core body comprising a plurality of teeth, wherein each tooth is protruded to a same direction at a predetermined gap, wherein the stator core body is one bendable, monolithically-formed body, wherein the stator core body comprises a first distal end and a second distal end;
   a first fixing unit including a first pin groove provided at the first distal end of the stator core body; and
   a second fixing unit including a second pin groove provided at the second distal end of the stator core body,
   wherein the stator core body comprises, between adjacent teeth of the plurality of teeth, a hook unit comprising a hook lug and a complementary lug accommodation groove,
   wherein the stator core body further comprises:
   a first lateral portion and a second lateral portion protruding outwardly from an outer surface of the first distal end and spaced apart from each other;
   a first hitching sill protruding from the first lateral portion towards the second lateral portion;
   a second hitching sill protruding from the second lateral portion towards the first lateral portion and spaced apart from the first hitching sill;
   a third lateral portion and a fourth lateral portion protruding outwardly from an outer surface of the second distal end and spaced apart from each other;
   a third hitching sill protruding from the third lateral portion towards the fourth lateral portion; and
   a fourth hitching sill protruding from the fourth lateral portion towards the third lateral portion and spaced apart from the third hitching sill;
   wherein the first lateral portion comprises an inner surface facing the second lateral portion,
   wherein the second lateral portion comprises an inner surface facing the first lateral portion,
   wherein the third lateral portion comprises an inner surface facing the fourth lateral portion,
   wherein the fourth lateral portion comprises an inner surface facing the third lateral portion,
   wherein the first hitching sill comprises an inner surface facing the outer surface of the first distal end and a lateral surface facing the second hitching sill such that a first opening is present between the lateral surface of the first hitching sill and the lateral surface of the second hitching sill,
   wherein the second hitching sill comprises an inner surface facing the outer surface of the first distal end and a lateral surface facing the lateral surface of the first hitching sill;
   wherein the third hitching sill comprises an inner surface facing the outer surface of the second distal end and a lateral surface facing the fourth hitching sill such that a second opening is present between the lateral surface of the third hitching sill and the lateral surface of the fourth hitching sill,
   wherein the fourth hitching sill comprises an inner surface facing the outer surface of the second distal end and a lateral surface facing the lateral surface of the third hitching sill,
   wherein the first pin groove is bounded in part by the outer surface of the first distal end, the inner surface of the first lateral portion, the inner surface of the second lateral portion, the inner surface of the first hitching sill, and the inner portion of the second hitching sill and extends through the first opening between the lateral surface of the first hitching sill and the lateral surface of the second hitching sill, such that the first pin groove has a 'T' shape; and
   wherein the second pin groove is bounded in part by the outer surface of the second distal end, the inner surface of the third lateral portion, the inner surface of the fourth lateral portion, the inner surface of the third hitching sill, and the inner portion of the fourth hitching sill and extends through the second opening between the lateral surface of the third hitching sill and the lateral surface of the fourth hitching sill, such that the second pin groove has a 'T' shape.

2. The stator core precursor of claim 1, wherein each of the first and second pin grooves inhibits disengagement of a received fixing pin in a direction perpendicular to a direction of an inserted coupling of the fixing pin.

3. The stator core precursor of claim 1, wherein each of the first and second pin grooves is configured to receive a fixing pin provided with an 'H' shape.

4. The stator core precursor of claim 3, wherein each corner of each of the first and second pin grooves is rounded, such that each of the first and second pin grooves is configured to receive a fixing pin having each corner rounded.

5. A stator core, comprising the stator core precursor of claim 4 bent into a curved shape.

6. The stator core precursor of claim 1, wherein each of the first and second pin grooves is configured to receive a fixing pin having the same thickness as that of the stator core body.

7. The stator core precursor of claim 1, wherein an edge portion of the hook unit in an interlocking complementary structure is rounded.

8. The stator core precursor of claim 1, wherein the hook unit further comprises a gap groove configured to reduce interference during a bending process of the stator core body.

9. The stator core precursor of claim 1, wherein a thickness of the hook unit is the same as that of the first and second distal ends of the stator core body.

10. A stator core, comprising the stator core precursor of claim 9 bent into a curved shape.

11. The stator core precursor of claim 1, wherein the first fixing unit has a first structure, wherein the second fixing unit has a second structure, and wherein the first and second structures are configured such that a fixing pin having an "H" shape can be used to couple the first structure to the second structure.

12. A stator core, comprising the stator core precursor of claim 11 bent into a curved shape.

13. A stator core, comprising the stator core precursor of claim 1 bent into a curved shape.

* * * * *